R. S. M. MITCHELL.
ROTARY PISTON APPARATUS.
APPLICATION FILED JUNE 17, 1915. RENEWED APR. 28, 1921.
1,405,736.
Patented Feb. 7, 1922.
2 SHEETS—SHEET 1.
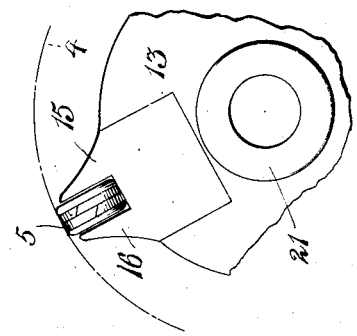
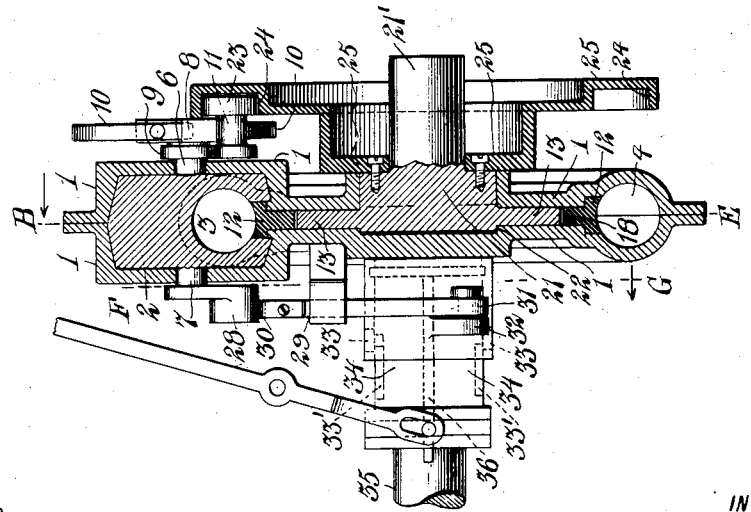
WITNESSES
INVENTOR
Richard S. M. Mitchell
BY
ATTORNEYS R. S. M. MITCHELL.
ROTARY PISTON APPARATUS.
APPLICATION FILED JUNE 17, 1915. RENEWED APR. 28, 1921.
1,405,736.
Patented Feb. 7, 1922.
2 SHEETS—SHEET 2.
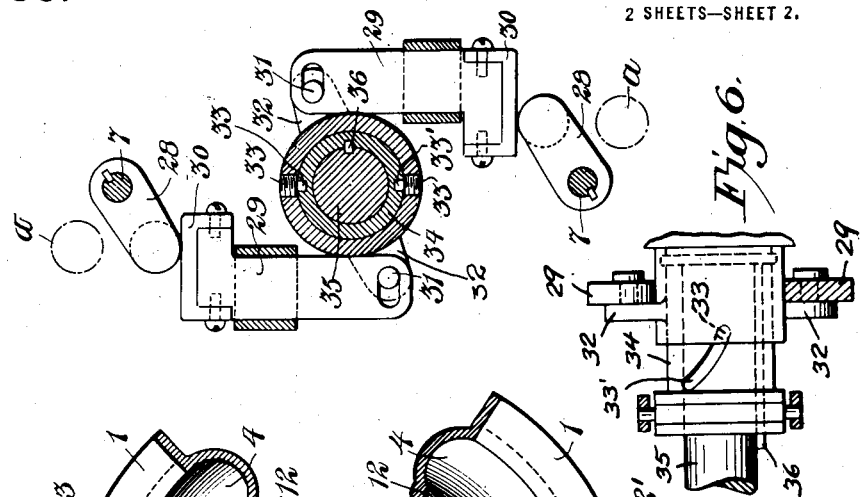
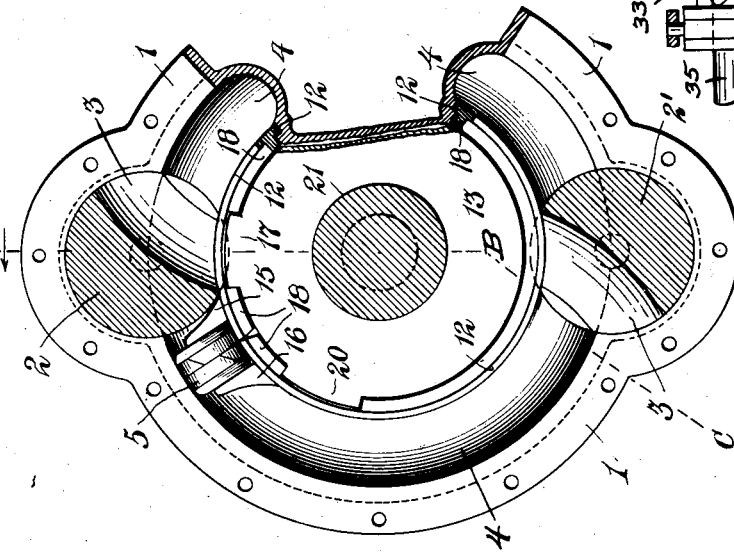
WITNESSES
INVENTOR
Richard S. M. Mitchell
BY
ATTORNEYS

UNITED STATES PATENT OFFICE.

RICHARD S. M. MITCHELL, OF PORT JEFFERSON, NEW YORK.

ROTARY PISTON APPARATUS.

1,405,736.  Specification of Letters Patent.  Patented Feb. 7, 1922.

Application filed June 17, 1915, Serial No. 34,768. Renewed April 28, 1921. Serial No. 465,247.

*To all whom it may concern:*

Be it known that I, RICHARD S. M. MITCHELL, citizen of the United States, and resident of Port Jefferson, in the county of Suffolk and State of New York, have invented certain new and useful Improvements in Rotary Piston Apparatus, of which the following is a specification.

This invention relates to rotary piston apparatus. The invention is capable of embodiment in machines of various kinds and classes, the embodiment shown in the present application being a power transmission or clutch mechanism of the kind generally referred to as a fluid or hydraulic clutch, such mechanism being adapted for the transmission of power from one shaft or member to another in variable speed ratio.

The invention aims generally to provide an improved apparatus which comprises members having a relative rotary movement permitted or controlled by abutments adapted to extend from one member into the path of relative movement of the other member; and more particularly the invention aims to provide an improved apparatus of that type in which a rotary piston travels in a continuous piston chamber or passage which is closed at separated points by abutments which are operated to permit movement of the piston past the abutment points; and to provide such an apparatus which shall have to a high degree the characteristics of efficiency in operation, durability, strength and simplicity of construction.

In the particular embodiment shown, the objects are to provide a transmission or clutch mechanism which is simple in its construction and operation, and which will permit of a gradual variation of the relative speed of the driven shaft; to provide between the driving and driven shafts a mechanism which acts as a torsional shock absorber; to provide a transmission mechanism which may be used to cause the rotative effort of the driving shaft to act as a braking force on the driven shaft, and, when the rotation of the driving shaft is reversed, to reverse the direction of rotation of the driven shaft without undue shock; and to provide such a mechanism which while having a wide range of velocity ratios has a comparatively small number of working parts and is of great mechanical efficiency.

The drawings illustrate a transmission mechanism or fluid clutch embodying the invention. In said drawings:—

Fig. 1 is a sectional view taken on line A—B—C of Fig. 3;

Fig. 2 is a view in elevation and partly broken away of the abutment operating cam and arms looking from the right in Fig. 1, the casing not being shown;

Fig. 3 is a sectional view taken on line B—E of Fig. 1;

Fig. 4 is a sectional view taken on line F—G of Fig. 1;

Fig. 5 is a fragmentary view illustrating a modified arrangement for carrying the piston; and Fig. 6 is a detail view looking from above in Fig. 1 and partly in section of the sliding sleeve and cooperating parts for adjusting the position of the stops 29.

Referring first to Figs. 1 and 3, the clutch mechanism shown comprises two relatively rotary members carried by and secured fast to the ends of two shafts 21' and 35, one of which is the driven shaft and the other the power or driving shaft, which shafts are in axial alignment and will be mounted in suitable bearings not shown. In the construction shown either shaft may be the power shaft, but for convenience the shaft 21' will be referred to hereinafter as the power shaft, and with the arrangement shown this shaft usually will be the power shaft.

The clutch member 1 carried by the shaft 35 is in the form of a circular casing made up of two parts secured together flatwise and cored or otherwise formed on their inner faces with grooves which when the two parts of the casing are joined together provide an annular piston chamber or passage 4, the cross-sectional contour of which is continuously curved, and most desirably circular as shown, and which is of uniform dimensions throughout its extent. A continuous slot opens through the wall of the piston passage at the side of least longitudinal circumference thereof, or toward the axis of relative rotation of the clutch members, and extends inward to receive a piston carrying disk 13 which is carried by and turns with the power shaft 21'. One part of the casing or passage member 1 is secured fast to the shaft 35, and the other part carried by the first part is formed with a central flanged opening to receive the hub 21 of the piston-carrying disk 13. The hub 21 is also provided with a boss 22 which extends into a recess in the first mentioned part of the passage member, the boss and recess both being concentric with the axis of the aligned driving and driven shafts and being fitted to afford an additional bearing between the clutch members for maintaining alignment. The piston 5 is held to move with the disk 13 relatively to the chamber member 1 by lugs 15 and 16 extending from the carrier disk into the piston passage, being thus free to accommodate itself to the chamber or passage 4. The outer or peripheral portion of the piston-carrying disk fills or closes the continuous slot opening into the piston chamber.

In the construction shown in Figs. 1 and 3, the outer portion of the piston carrying disk is formed by a T-shaped packing ring 12 which is connected to turn with the main body of the carrier disk 13 by means of lugs on the periphery of the disk, two such lugs 17 and 20 being shown in Fig. 3, which extend into spaces formed in the packing ring by cutting away portions of the web 18 of the ring, the piston lugs 15 and 16 in this construction being carried by the packing ring 12. It is sometimes desirable to omit the packing ring 12 and have the piston lugs 15 and 16 carried directly by the main body of the disk 13, as shown in Fig. 5. As shown in Figs. 3 and 5, the piston 5 is of cylindrical form and is provided with suitable packing, being shown as provided with ordinary packing rings. The piston is also desirably formed with bevelled edges as shown in Figs. 3 and 5, whereby, if either of the passage closing abutments (hereinafter described) should for any reason not be moved to bring its piston passage into approximately exact register with the annular passage 4, the piston will move the abutment into approximately exact position and thereby avoid damage to the piston packing which would otherwise result.

Abutments or valves 2, 2' are provided to prevent or restrict flow of fluid past the abutment points, the construction shown being provided with two such abutments arranged at diametrically opposite points. These abutments are circular in cross-section and may be cylindrical in form, or slightly tapered from the center toward each end as shown. They are of a diameter substantially greater than the cross-sectional diameter of the annular passage 4 or dimension of the passage radially of the shaft axis, and are of a length greater than the width or cross-sectional diameter of the passage, and they are mounted to turn on axes parallel to the axis of the shafts 35 and 21' in abutment chambers formed in the casing 1 intersecting the annular passage. The abutments fit closely within the abutment chambers as shown and extend beyond the annular passage in all directions transversely of the passage, the radius of each abutment exceeding the distance from the axis thereof to the wall of the annular passage at the smallest longitudinal circumference thereof.

Each of the rotary abutments is formed with a port or passage 3 which is of the same longitudinal curvature and of the same cross-section as the annular passage 4, and which is located in the abutment so that by turning the abutment its passage 3 may be brought into register with and form a continuation of or a part of the annular passage 4. Each abutment is also formed with a slot extending outward from its passage 3, corresponding to the casing slot and serving to receive the outer portion of the piston carrier when the abutment is in position with its passage in register with the annular passage 4 to permit the piston to pass. As shown, the abutments are made in the form of solid plugs or bodies, and the passage 3 of each abutment is a continuous walled passage. Whether the abutments be solid abutments as shown or not, they will be suitably ported to provide when turned to one position a passage forming part of the annular passage and of the same longitudinal curvature and the same cross-section as the rest of the annular passage.

It will be noticed that in the construction shown neither the edges of the walls of the annular passage 4 where it is intersected by the abutment chambers nor the edges of the walls of the piston passage 3 of the abutments will be parallel to the edge of the packing rings or other engaging part of the passing piston through any substantial part of their length. This avoidance of parallelism between the edge of the abutment or of the passage wall and the piston packing is of great importance in preventing damage to the piston packing.

Each of the abutments 2, 2' is provided with short rigidly connected axial studs or trunnions 6 and 7 which extend through the casing walls. The trunnion 6 carries outside the casing wall a rigidly connected arm 8 and a loosely connected arm 9. The arm 9 carries a cam roll 23 which runs in a cam groove 24 of a cam plate or disk 25 secured to the hub 21 of the piston carrying disk 13 so as to turn with the piston carrying disk and shaft 21'. The position of the arm 9 is thus at all times positively controlled by the cam groove 24. A spring 10 presses the arm 8 toward the arm 9 and tends to hold it in contact with the pin 11 carried by the arm 9, so that in the absence of any restraint on the movement of the arm 8 or of the abutment by which the arm is carried, the arm 8 and the abutment would move with the arm 9 as the latter is moved by the cam 24. The cam 24, the shape of which is indicated by the dotted lines 26 and 27 in Fig. 2, is so shaped that the arm 9 is held stationary during most of each relative rotation between the casing 1 and the piston carrier 13, and the position of the arm 8 with relation to the abutment is such that if the arm 8 is allowed to bear against the pin 11 of the arm 9 when the arm 9 is in this position, the abutment will be in its closed position as shown in Fig. 3; and the cam has an outwardly extending portion formed and positioned to throw the arm 9 outward as the piston approaches either abutment to thereby turn the abutment in clockwise direction from the position shown in Fig. 3 to bring the abutment passage 3 into position to permit the piston to pass, and after the piston has passed the abutment the arm 9 is returned to its normal position, thereby returning the abutment to its passage obstructing position.

The cam 24 acting through the arms 9 and 8 will thus shift the abutments alternately into position for the passing of the piston, each abutment being so shifted just in time to permit the piston to pass. At other times, the arms 9 will be in position to permit the abutments to stand in their passage obstructing position; and while either abutment is turned to bring its passage 3 into alignment with the annular passage 4 for the passing of the piston, the other abutment will, unless its closing movement is wholly restrained, be maintained in passage obstructing position.

For the purpose of limiting to a desired degree the closing movement of the abutments and thereby varying the degree of obstruction of the annular passage by the abutments when in their normal, or passage-obstructing, position, the shaft 7 of each abutment is provided with an arm 28 keyed thereto which under action of the spring 10, bears on an L-shaped stop 29 provided with a pad 30 of soft material and suitably guided and fitted to engage a pin 31 of a rock arm 32 carried by a sleeve mounted on a sliding sleeve 34 on the shaft 35, the rock arm sleeve carrying pins 33 which extend into spiral grooves 33' in the sleeve 34. The sliding sleeve 34 is connected to the shaft 35 to turn therewith by a feather key 36, so that when the sleeve 34 is moved longitudinally on the shaft 35 toward the casing 1, the rock arm 32 will be rocked through the action of the spiral grooves 33' on the engaging pins 33 to move the stops 29 outward, and movement of the sleeve 34 in the opposite direction will in a similar manner move the stops 29 inward. When the stops 29 are in their innermost position, the abutments are free to turn under action of the spring 10 to the position shown in Fig. 3 for closing the annular passage 4 when the cam arms 9 are in the position shown in Fig. 2. By shifting the sleeve 34 and rocking the arm 32 to move the stops 29 outward, the closing movement of the abutments may be limited or restrained so as to cause them to take positions to obstruct the passage 4 more or less when the arms 9 are in the position shown in Fig. 2, and when the stops 29 have been moved out sufficiently to hold the arms 28 in the positions indicated at $a$ in Fig. 4, the abutments will be prevented from making any closing movement whatever and will remain in position each with its passage 3 in register with the annular passage 4 throughout the relative rotations of the casing 1 and piston carrier.

When the power transmission mechanism or hydraulic clutch shown is in operation, the piston passage 4 is filled with a suitable mobile medium, usually a liquid. With the abutments prevented from making any closing movement so that the piston passage is unobstructed, the liquid is free to flow in the passage and therefore exerts no or practically no resistance to relative rotation between the casing 1 and the piston. If then the sleeve 34 be moved outward, the abutments will be permitted to close and obstruct the annular piston passage more or less according to the position of the sleeve, and the liquid will then have to flow through restricted orifices the size of which depends upon the position of the abutments; and as the flow of a fluid under pressure varies with the area of a flow controlling orifice, the relative rotative velocities of the casing 1 and piston for any given rotative effort on the driving shaft will vary with variations of the area of the orifices maintained by the abutments, so that by adjustment of the sleeve 34 to vary the degree of obstruction of the piston passage by the abutments when in their closed position the speed of the driven member, or the amount of slip permitted between the driven and driving members, may be controlled as desired. When the adjustment is such as to permit the abutments to make their full closing movement to completely obstruct the passage except for such orifice as may be purposely provided to guard against transmission of shock the liquid will be practically locked between the driving and driven members and relative rotation of the members practically prevented, and the driven member will be caused to rotate at practically the same speed as the driving member, this being the condition of minimum velocity ratio between the piston and the casing.

Should either shaft or clutch member have imparted to it a sudden load, with any setting of the abutments, the sudden increase in load or pressure on the medium between the piston and the abutments will result in an increase in velocity of flow of the medium through the maintained orifices and a corresponding increase in velocity ratio between the casing 1 and the piston, with absorption of the shock of the sudden increase of load on the driving or driven member. The more mobile the medium used, the more efficient will be this shock absorbing action.

It will be seen from Fig. 3 that there is no change in total volume of the medium-containing space with any change in position of the abutments. Because of this, there is no sudden slip of the piston 5 or increase of load on the abutments during the changes of position of the abutments; the pressure on the piston being maintained constant regardless of its position and the position of the abutments.

It will be noticed, also, that the action of the cam groove 24 on the arm 9 is such as to turn the abutments for the passage of the piston without regard to the direction of relative rotation of the piston and casing 1. It follows that the mechanism will operate equally well with relative rotation of the casing and piston in either direction, and the power applied to one shaft may be utilized to retard and reverse the direction of rotation of the other shaft by exerting a brake action thereof.

What is claimed is:

1. In a rotary piston apparatus, a driving shaft, a driven shaft, a casing on one of said shafts formed with an annular passage the cross-sectional contour of which is continuously curved and which has a continuous slot extending therefrom, means carried by the other shaft for filling said slot to form a closed chamber of said passage adapted to contain a mobile medium, a piston closely fitted into said passage carried by said means, a plurality of abutments in said casing extending across said passage and beyond the passage in all directions transverse thereto, means for setting said abutments to obstruct said passage in desired degree to correspondingly affect the flow of said medium, and means for actuating each of said abutments to permit the passage of said piston.

2. In a rotary piston apparatus, a driving shaft, a driven shaft, a casing on one of said shafts formed with an annular passage the cross-sectional contour of which is continuously curved and which has a continuous slot extending therefrom, means carried by the other shaft for filling said slot to form a closed chamber of said passage adapted to contain a mobile medium, a piston closely fitted into said passage carried by said means, a plurality of abutments in said casing extending across said passage and beyond the passage in all directions transverse thereto and each having a passage shaped to form a continuation of said annular passage, means for setting said abutments to obstruct said annular passage in desired degree to correspondingly affect the flow of said medium, and means for actuating each of said abutments to permit the passage of said piston.

3. In a rotary piston apparatus, a driving shaft, a driven shaft, a casing on one of said shafts formed with an annular passage the cross-sectional contour of which is continuously curved and which has a continuous slot extending therefrom, means carried by the other shaft for filling said slot to form a closed chamber of said passage adapted to contain a mobile medium, a piston closely fitted into said passage carried by said means, a plurality of rotary abutments in said casing circular in cross-section and each having a passage shaped to form a part of said annular passage of the same longitudinal curvature and the same cross-section as the rest of said annular passage, means for setting said abutments to obstruct said annular passage in desired degree to correspondingly affect the flow of said medium, and means for turning each of said abutments into position to permit the passage of said piston.

4. In a rotary piston apparatus, a driving shaft, a driven shaft, a casing on one of said shafts formed with an annular passage the cross-sectional contour of which is continuously curved and which has a continuous slot extending therefrom, means carried by the other shaft for filling said slot to form a closed chamber of said passage adapted to contain a mobile medium, a piston closely fitted into said passage and loosely carried by said means, a plurality of abutments in said casing, means for setting said abutments to obstruct said passage in desired degree to correspondingly affect the flow of said medium, and means for actuating each of said abutments to permit the passage of said piston.

5. In a rotary piston apparatus, a driving shaft, a driven shaft, a casing on one of said shafts formed with an annular passage the cross-sectional contour of which is continuously curved and which has a continuous slot extending therefrom, means carried by the other shaft for filling said slot to form a closed chamber of said passage adapted to contain a mobile medium, a piston closely fitted into said passage, an element carried by said means on each side of said piston to cause said piston and said means to turn together, a plurality of abutments in said casing extending across said passage, means for setting said abutments to obstruct said passage in desired degree to correspondingly affect the flow of said medium, and means for actuating each of said abutments to permit the passage of said piston.

6. In a rotary piston apparatus, a driving shaft, a driven shaft, a casing carried on one of said shafts formed with an annular passage the cross-sectional contour of which is continuously curved and which has a continuous slot extending therefrom, means carried by the other shaft for filling said slot to form a closed chamber of said passage adapted to contain a mobile medium, a piston loosely carried by said means and closely fitted into said passage, packing rings on said piston engaging the walls of said passage, a plurality of abutments in said casing, means for setting said abutments to obstruct said passage in desired degree to correspondingly affect the flow of said medium, and means for actuating each of said abutments to permit the passage of said piston.

7. In a rotary piston apparatus, a driving shaft, a driven shaft, a casing carried on one of said shafts formed with an annular passage the cross-sectional contour of which is continuously curved and which has a continuous slot extending therefrom, means comprising a T-shaped packing carried by the other shaft for filling said slot to form a closed chamber of said passage adapted to contain a mobile medium, a piston closely fitted into said passage carried by said means, a plurality of abutments in said casing, means for setting said abutments to obstruct said chamber in desired degree to correspondingly affect the flow of said medium, and means for actuating each of said abutments to permit the passage of said piston.

8. In a rotary piston apparatus, a driving shaft, a driven shaft, a casing on one of said shafts formed with an annular passage the cross-sectional contour of which is continuously curved and which has a continuous slot extending through the wall thereof at the side of least longitudinal circumference, a disk carried by the other shaft in the plane of said slot, a T-shaped packing carried by said disk and filling said slot to form a closed chamber of said passage adapted to contain a mobile medium, said disk having peripheral projections thereon resting within recesses in the inner edge of said T-shaped packing, a piston loosely carried by said packing and closely fitted into said passage, a plurality of abutments in said casing, means for setting said abutments to obstruct said chamber in desired degree to correspondingly affect the flow of said medium, and means for actuating each of said abutments to permit passage of said piston.

9. In a rotary piston apparatus, a driving shaft, a driven shaft, a casing on one of said shafts formed with an annular passage the cross-sectional contour of which is continuously curved and which has a continuous slot extending therefrom, an annular T-shaped packing piece carried by the other shaft for filling said slot the outer surface of which forms a continuation of said cross-sectional contour of the passage to form a closed chamber adapted to contain a mobile medium, a piston carried by said packing and closely fitted into said passage, a plurality of abutments in said casing, means for setting said abutments to obstruct said chamber in desired degree to correspondingly affect the flow of said medium, and means for actuating each of said abutments to permit the passage of said piston.

10. In a rotary piston apparatus, a driving shaft, a driven shaft, a casing on one of said shafts formed with an annular passage the cross-sectional contour of which is continuously curved and which has a continuous slot extending through the wall thereof at the side of least longitudinal circumference, means carried by the other shaft for filling said slot to form a closed chamber of said passage adapted to contain a mobile medium, a piston carried by said means and closely fitted into said passage, a plurality of rotary abutments in said casing extending across said passage and each having a passage shaped to form a continuation of said annular passage, the radius of each of said abutments exceeding the distance from the axis thereof to the wall of the annular passage at the smallest longitudinal circumference thereof, whereby the rotary movement of each abutment is limited and a tight closure between each abutment and the periphery of said piston carrying means results, means for setting said abutments to obstruct said annular passage in desired degree to correspondingly affect the flow of said medium, and means for actuating each of said abutments to permit the passage of said piston.

11. In a rotary piston apparatus, a shaft, a casing formed with an annular passage the cross-sectional contour of which is continuously curved and which has a continuous slot extending therefrom, means carried by said shaft for filling said slot to form a closed chamber of said passage, a piston carried by said means and closely fitting said passage, a plurality of abutments in said casing extending across said annular passage and beyond the passage in all directions transverse thereto and each having a passage shaped to form a continuation of said annular passage when the abutment is moved into position to permit the piston to pass, and means for actuating said abutments.

12. In a rotary piston apparatus, a shaft, a casing formed with an annular passage the cross-sectional contour of which is continuously curved and which has a continuous slot extending therefrom, means carried by said shaft for filling said slot to form a closed chamber of said passage, a piston carried by said means and closely fitting said passage, a plurality of rotary abutments in said casing extending across said annular passage and beyond the passage in all directions transverse thereto and each having a passage of the same contour longitudinally and transversely as said annular passage, and actuating means for turning each abutment to bring its passage into position to form a continuation of the annular passage for passage of the piston.

13. In a rotary piston apparatus, a shaft, a casing formed with an annular passage the cross-sectional contour of which is continuously curved and which has a continuous slot extending through the wall thereof at the side of least longitudinal circumference, a rotary piston carrier carried by said shaft filling said slot to form a closed chamber of said passage, a piston carried by said carrier and closely fitting said passage, a plurality of rotary abutments in said casing extending across said annular passage, each having a passage shaped to form a continuation of said annular passage when the abutment is turned to permit the piston to pass, and the radius of each of which is greater than the distance from the axis thereof to the wall of said annular passage at the smallest longitudinal circumference thereof, whereby said abutments when closed bear against the periphery of said piston carrier to prevent leakage.

14. In a rotary piston apparatus, a shaft, a casing formed with an annular passage having a continuous slot extending therefrom, means carried by said shaft for filling said slot to form a closed chamber of said passage, a piston carried by said means and closely fitting said passage, a plurality of rotary abutments in said casing extending across said annular passage each having a passage of the same cross-section and the same longitudinal curvature as said annular passage and positioned to form a part of said annular passage when the abutment is turned into position to permit the piston to pass, and each having a slot opening from its passage to register with the slot extending from the annular passage, and means for actuating said abutments.

15. A passage obstructing abutment for a rotary piston apparatus, having a piston passage extending therethrough uniformly curved longitudinally and circular in cross-section and having a slot extending longitudinally of the passage and opening outward therefrom.

16. A rotary passage obstructing abutment for a rotary piston apparatus circular in cross-section and having a piston passage extending therethrough in a direction transverse to the axis of rotation of the abutment, said passage being uniformily curved longitudinally and its cross-sectional contour being continuously curved, and the abutment having a slot extending longitudinally of the passage and opening outward therefrom.

17. A rotary piston apparatus, comprising in combination a casing formed with an annular passage of uniform circular cross-section and a continuous slot opening inward through the wall of the passage, a rotary piston carrier extending into and by which said slot is closed, a piston in said passage connected to move with said carrier, a plurality of rotary abutments circular in cross-section and of a diameter substantially greater than the diameter of said passage and of a length greater than the diameter of said passage, said abutments being mounted with their axes parallel with the axis of rotation of said carrier in abutment chambers intersecting said annular passage, each of said abutments extending beyond said passage in all directions transverse to said passage and each being formed with a continuous walled passage of the same circular cross-section and the same longitudinal curvature as said annular passage and positioned to form a part of the annular passage when the abutment is turned to bring its passage into register with the annular passage and each abutment having a slot opening from its passage to register with said continuous slot, and means for turning each of said abutments into position to permit the piston to pass and into position to obstruct said annular passage after the piston has passed.

18. A rotary piston apparatus, comprising in combination a casing formed with an annular passage of uniform circular cross-section and a continuous slot opening inward through the wall of the passage, a rotary piston carrier extending into and by which said slot is closed, a piston in said passage connected to move with said carrier, a plurality of rotary abutments circular in cross-section and of a diameter substantially greater than the diameter of said passage and of a length greater than the diameter of said passage, said abutments being mounted with their axes parallel with the axis of rotation of said carrier in abutment chambers intersecting said annular passage, each of said abutments extending beyond said passage in all directions transverse to said passage and each being ported to provide when turned to one position a passage forming part of said annular passage and of the same longitudinal curvature and the same circular cross-section as the rest of said annular passage and being slotted to receive the piston carrier, and means for turning each of said abutments into position to permit the piston to pass and into position to obstruct said annular passage after the piston has passed.

19. A rotary piston apparatus, comprising in combination a casing formed with an annular passage of uniform cross-section and the cross-sectional contour of which is continuously curved and with a continuous slot opening inward through the wall of the passage, a rotary piston carrier extending into and by which said slot is closed, one piston in said passage connected to move with said carrier, two rotary abutments circular in cross-section and of a diameter substantially greater than the distance between the inner and outer walls of said annular passage and of a length greater than the width of said passage, said abutments being mounted with their axes parallel to the axis of rotation of said carrier in abutment chambers intersecting said annular passage at diametrically opposite points, each of said abutments extending beyond said passage in all directions transverse to said passage and each being ported to provide when turned to one position a passage forming part of said annular passage and of the same longitudinal curvature and the same cross-section as the rest of said annular passage and being slotted to receive the piston carrier, and means for turning each of said abutments into position to permit the piston to pass and into position to obstruct said annular passage after the piston has passed.

20. A rotary piston apparatus, comprising in combination a casing formed with an annular passage of uniform cross-section and the cross-sectional contour of which is continuously curved and with a continuous slot opening through the inner wall of the passage, a rotary piston carrier extending into and by which said slot is closed, a piston in said passage connected to move with said carrier, an abutment circular in cross-section and of a diameter substantially greater than the distance between the inner and outer walls of said annular passage and of a length greater than the width of said passage, said abutment being mounted with its axis parallel to the axis of rotation of said carrier in an abutment chamber intersecting said annular passage, and said abutment extending beyond said passage in all directions transverse to said passage and being ported to provide when moved to one position a passage forming part of said annular passage and of the same longitudinal curvature and the same cross-section as the rest of said annular passage and being slotted to receive the piston carrier, and means for moving said abutment into position to permit the piston to pass and into position to obstruct said annular passage after the piston has passed.

21. A rotary piston apparatus, comprising in combination a casing formed with an annular passage of uniform cross-section and a continuous slot opening through the inner wall of the passage, a piston carrier by which said slot is closed, said casing and said carrier being mounted to have a relative rotary movement about an axis concentric to said annular passage, a piston connected to move with said carrier and fitting said passage, a plurality of rotary abutments circular in cross-section and of a diameter substantially greater than the distance between the inner and outer walls of said annular passage and of a length greater than the width of said passage, said abutments being mounted with their axes parallel to the axis of relative rotation of said casing and piston carrier in abutment chambers intersecting said annular passage, each of said abutments extending beyond said passage in all directions transverse to said passage and each being ported to provide when turned to one position a passage forming part of said annular passage and of the same longitudinal and cross-sectional contour as the rest of said annular passage and being slotted to receive the piston carrier, and means for turning each of said abutments into position to permit the piston to pass and into position to obstruct said annular passage after the piston has passed.

22. A rotary piston apparatus, comprising in combination a casing formed with an annular passage of uniform cross-section and a continuous slot opening through the inner wall of the passage, a piston carrier by which said slot is closed, said casing and said carrier being mounted to have a relative rotary movement about an axis concentric to said annular passage, a piston connected to move with said carrier and fitting said passage, a plurality of rotary abutments circular in cross-section and of a diameter substantially greater than the distance between the inner and outer walls of said annular passage and of a length greater than the width of said passage, said abutments being mounted with their axes parallel to the axis of relative rotation of said casing and piston carrier in abutment chambers intersecting said annular passage, each of said abutments extending beyond said passage in all directions transverse to said passage and each being ported to provide when turned to one position a passage forming part of said annular passage and of the same longitudinal and cross-sectional contour as the rest of said annular passage and being slotted to receive the piston carrier, means for turning each of said abutments into position to permit the piston to pass and into position to obstruct said annular passage after the piston has passed, and adjustable means for varying the degree of obstruction of the annular passage by said abutments.

23. A rotary piston apparatus, comprising in combination a casing formed with an annular passage of uniform cross-section and the cross-sectional contour of which is continuously curved and with a continuous slot opening inward through the wall of the passage, a piston carrier by which said slot is closed, said casing and said carrier being mounted to have a relative rotary movement about an axis concentric to said annular passage, a piston in said passage connected to move with said carrier, an abutment mounted in an abutment chamber intersecting said annular passage, said abutment extending beyond said passage in all directions transverse thereto and being ported to provide when moved to one position a passage forming part of said annular passage and of the same longitudinal and cross-sectional contour as the rest of said annular passage and being slotted to receive the piston carrier, and means for moving said abutment into position to permit the piston to pass and into position to obstruct said annular passage after the piston has passed, the shape of said piston and of said abutment being such as to avoid parallelism between the edge of the wall engaging part of the piston and the edge of the abutment or the edge of the wall of the annular passage at the place of intersection by the abutment chamber.

Signed at New York city, in the county of New York and State of New York, this sixteenth day of June, A. D. 1915.

RICHARD S. M. MITCHELL.

Witnesses:
GEORGE F. BENTLEY,
RICHARD V. ROGERS.